US012451642B2

(12) United States Patent
Yao et al.

(10) Patent No.: US 12,451,642 B2
(45) Date of Patent: Oct. 21, 2025

(54) SEALING INSTALLATION DEVICE AND CONNECTOR ASSEMBLY

(71) Applicants: Tyco Electronics (Shanghai) Co. Ltd., Shanghai (CN); SIBAS Electronics (Xiamen) Co. Ltd., Xiamen (CN)

(72) Inventors: Liqiang (Gino) Yao, Shanghai (CN); Yong (Chris) Wang, Shanghai (CN); Aibing (Alan) Dong, Shanghai (CN); Renzhong (Andy) Lin, Xiamen (CN)

(73) Assignees: Tyco Electronics (Shanghai) Co. Ltd., Shanghai (CN); SIBAS Electronics (Xiamen) Co. Ltd., Xiamen (CN)

( * ) Notice: Subject to any disclaimer, the term of this patent is extended or adjusted under 35 U.S.C. 154(b) by 618 days.

(21) Appl. No.: 17/836,179

(22) Filed: Jun. 9, 2022

(65) Prior Publication Data

US 2022/0399674 A1 Dec. 15, 2022

(30) Foreign Application Priority Data

Jun. 10, 2021 (CN) ......................... 202121292487.7

(51) Int. Cl.
*H01R 13/512* (2006.01)
*H01R 13/52* (2006.01)

(52) U.S. Cl.
CPC ....... *H01R 13/512* (2013.01); *H01R 13/5202* (2013.01)

(58) Field of Classification Search
CPC .... H01R 13/502; H01R 13/512; H01R 13/52; H01R 13/5202; H01R 13/5219; H01R 13/5213
USPC ................................ 439/587, 588, 589, 586
See application file for complete search history.

(56) References Cited

U.S. PATENT DOCUMENTS 4,023,882 A * 5/1977 Pettersson ................ H01R 4/26 439/587
2012/0111596 A1* 5/2012 Mortun ................ H01R 13/746 174/50.5
2019/0348797 A1* 11/2019 Shiraishi ............ H01R 13/6315

* cited by examiner

*Primary Examiner* — Abdullah A Riyami
*Assistant Examiner* — Amara Anderson
(74) *Attorney, Agent, or Firm* — Barley Snyder

(57) ABSTRACT

A sealing installation device for hermetically mounting a housing to a panel includes an elastic sealing washer and a connection member. The elastic sealing washer is disposed between a base of the housing and the panel and seals a mating interface between the base and the panel. The elastic sealing washer has a through slot into which a protrusion formed on a bottom surface of the base is inserted. A thickness of the elastic sealing washer is greater than a height of the protrusion. The connection member connects the base of the housing, the elastic sealing washer, and the panel together. A difference between the thickness of the elastic sealing washer and the height of the protrusion is a predetermined value equal to a compression amount of the elastic sealing washer after the housing is installed on the panel.

17 Claims, 6 Drawing Sheets

SEALING INSTALLATION DEVICE AND CONNECTOR ASSEMBLY

CROSS-REFERENCE TO RELATED APPLICATION

This application claims the benefit of the filing date under 35 U.S.C. § 119(a)-(d) of Chinese Patent Application No. 202121292487.7, filed on Jun. 10, 2021.

FIELD OF THE INVENTION

The present invention relates to a sealing installation device and a connector assembly including the sealing installation device.

BACKGROUND

Sometimes the housing of a connector needs to be hermetically installed on a panel. To ensure the sealing between the housing and panel of the connector, a sealing ring is usually provided between the housing of the connector and the panel, and screws are used to connect the housing of the connector and the panel together. After installation, the sealing ring is squeezed between the housing of the connector and the panel to realize the seal between them.

In the prior art, in order to improve the sealing performance, it is also necessary to provide a sealing ring on the connection member, which will increase the parts and assembly cost. In addition, the sealing performance between the housing of the connector and the panel generally depends on the compression amount of the sealing ring, which in the existing structure mainly depends on the torque of the screw. This requires the use of a special screwdriver with constant torque. Otherwise, the torque error of locking will increase, resulting in unstable compression of the sealing ring, which may lead to unstable sealing performance.

SUMMARY

A sealing installation device for hermetically mounting a housing to a panel includes an elastic sealing washer and a connection member. The elastic sealing washer is disposed between a base of the housing and the panel and seals a mating interface between the base and the panel. The elastic sealing washer has a through slot into which a protrusion formed on a bottom surface of the base is inserted. A thickness of the elastic sealing washer is greater than a height of the protrusion. The connection member connects the base of the housing, the elastic sealing washer, and the panel together. A difference between the thickness of the elastic sealing washer and the height of the protrusion is a predetermined value equal to a compression amount of the elastic sealing washer after the housing is installed on the panel.

BRIEF DESCRIPTION OF THE DRAWINGS

The invention will now be described by way of example with reference to the accompanying Figures, of which.

DETAILED DESCRIPTION OF THE EMBODIMENTS

Figure 1:
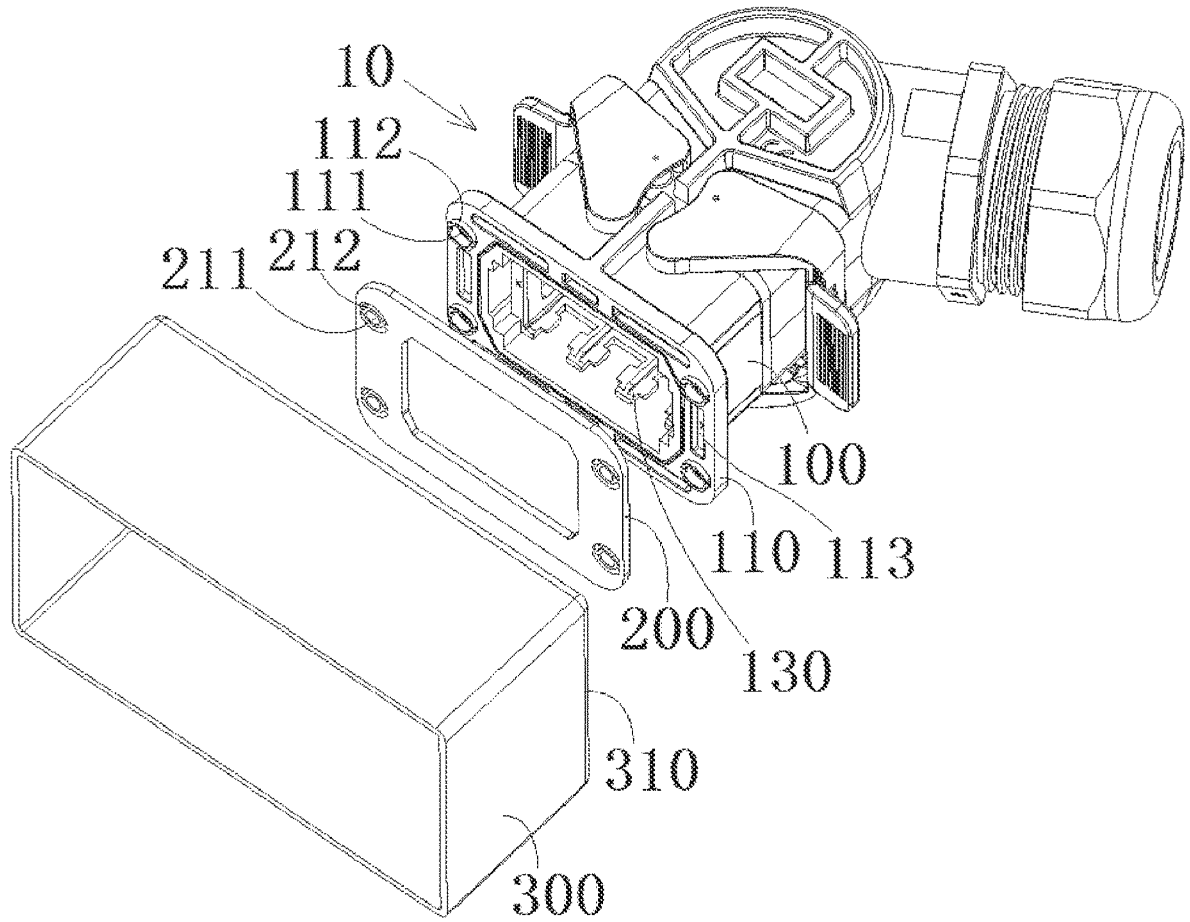
FIG. 1 is an exploded perspective view of a connector assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth to provide a thorough understanding of the disclosed embodiments. It will be apparent, however, that one or more embodiments may be practiced without these specific details. In other instances, well-known structures and devices are schematically shown to simplify the drawing.

As shown in FIG. 1, in the illustrated embodiment, a connector assembly mainly includes a connector 10, a connection member 120, and an elastic sealing washer 200. The connector 10 includes a housing 100. The housing 100 has a base 110 for mounting. The connection member 120 is used to connect the base 110 of the housing 100 to the panel 310. The elastic sealing washer 200 is arranged between the base 110 of the housing 100 and the panel 310 to seal the mating interface between them. In the illustrated embodiment, the panel 310 may be a flat plate or a wall of an electrical equipment housing 300.

As shown in FIGS. 1 to 4, an exemplary embodiment of the present invention discloses a sealing installation device for hermetically installing the housing 100 on the panel 310. The sealing installation device mainly includes an elastic seal washer 200 and a connection member 120. The elastic sealing washer 200 is arranged between the base 110 of the housing 100 and the panel 310 to seal the mating interface between them. The connection member 120 is used to connect the base 110 of the housing 100, the elastic sealing washer 200 and the panel 310 together.

Figure 6:
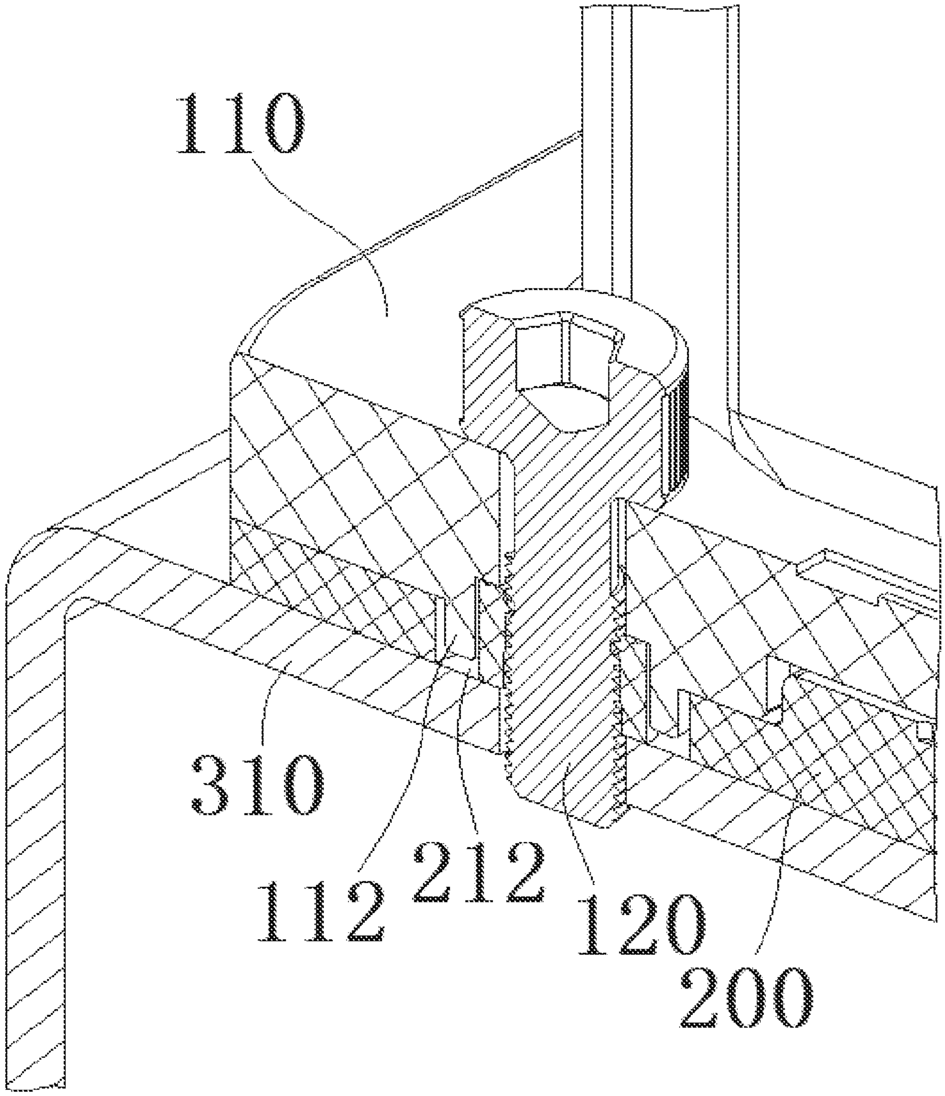
FIG. 6 is a detail view of a portion of the connector assembly shown in FIG. 5.

As shown in FIGS. 1 and 6, in the illustrated embodiment, a protrusion 112 is formed on the bottom surface of the base 110 of the housing 100. A through slot 212 is formed on the elastic sealing washer 200. The protrusion 112 is inserted into the through slot 212. The thickness of the elastic sealing washer 200 (referring to the thickness of the elastic sealing washer 200 when it is not compressed) is greater than the height of the protrusion 112 protruding from the bottom surface of the base 110 of the housing 100. The difference between the thickness of the elastic sealing washer 200 and the height of the protrusion 112 is equal to a predetermined value, to ensure that the compression amount of the elastic sealing washer 200 is equal to the predetermined value after the housing 100 is installed on the panel 310.

In the shown embodiment, the compression amount of the elastic sealing washer 200 is determined by the difference between the thickness of the elastic sealing washer 200 and the height of the protrusion 112 on the housing 100. Therefore, it can be ensured that the compression amount of the elastic sealing washer 200 is always equal to the predetermined value after the housing 100 is installed on the panel 310. The sealing reliability and stability between the housing 100 and the panel 310 are ensured.

Compared with the elastic sealing washer 200, the protrusion 112 can be regarded as rigid. Therefore, after the protrusion 112 abuts against the panel 310, the elastic sealing washer 200 cannot be further compressed. In this way, the compression amount of the elastic sealing washer 200 is always equal to the predetermined value after the housing 100 is installed on the panel 310.

Figure 3:
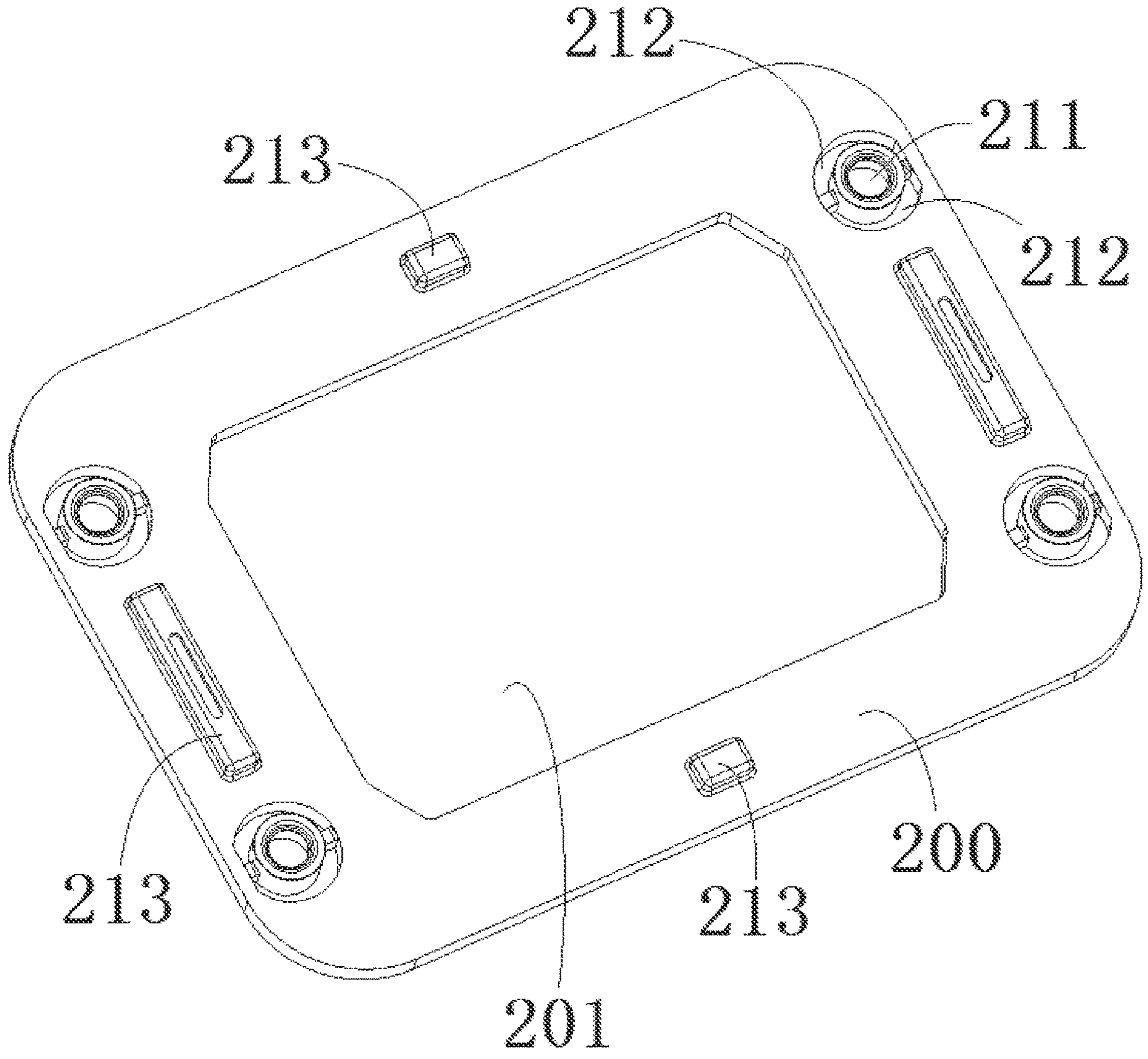
FIG. 3 is a perspective view of an elastic sealing washer of the connector assembly.

As shown in FIGS. 1 and 3, a through hole 211 allowing the connection member 120 to pass through is formed on the elastic sealing washer 200. The inner diameter of the through hole 211 is slightly smaller than the outer diameter of the connection member 120, so that the connection member 120 is in close contact with the inner wall of the through hole 211 after the housing 100 is installed on the panel 310, which may further improve the sealing performance.

In the shown embodiment, the cross-sectional shape of the through slot 212 is the same as that of the protrusion 112, but the cross-sectional size of the through slot 212 is slightly smaller than that of the protrusion 112. In this way, the protrusion 112 is in close contact with the inner wall of the through slot 212 after the housing 100 is installed on the panel 310 by the seal or sealing installation device, which may further improve the sealing performance.

Figure 2:
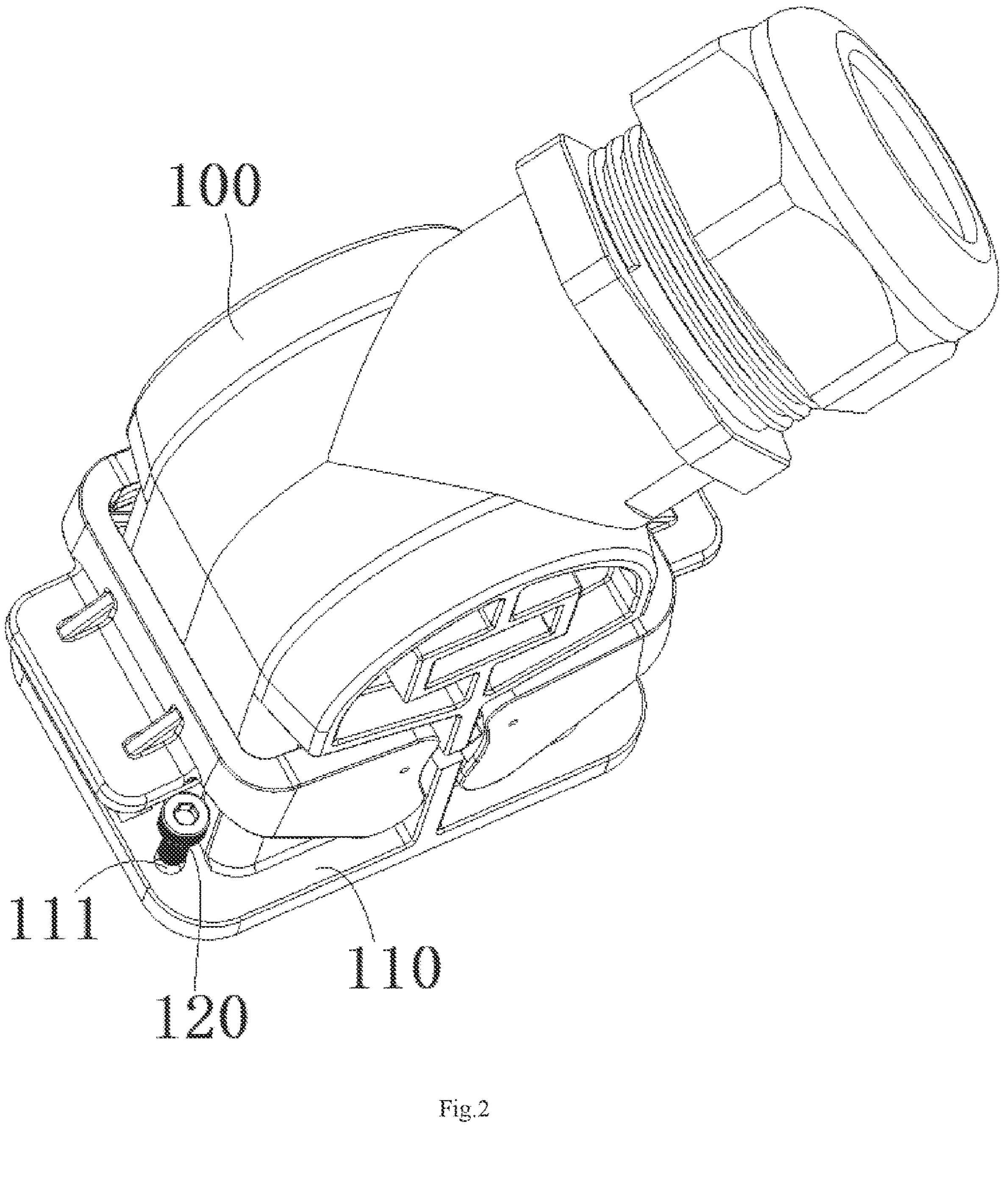
FIG. 2 is a perspective view of a connector of the connector assembly.

As shown in FIGS. 1 and 2, a first connection hole 111 corresponding to the through hole 211 is formed on the base 110 of the housing 100. The connection member 120 passes through the first connection hole 111 and the through hole 211. The inner diameter of the first connection hole 111 is slightly larger than the outer diameter of the connection member 120, to allow the connection member 120 to pass there through.

Figure 4:
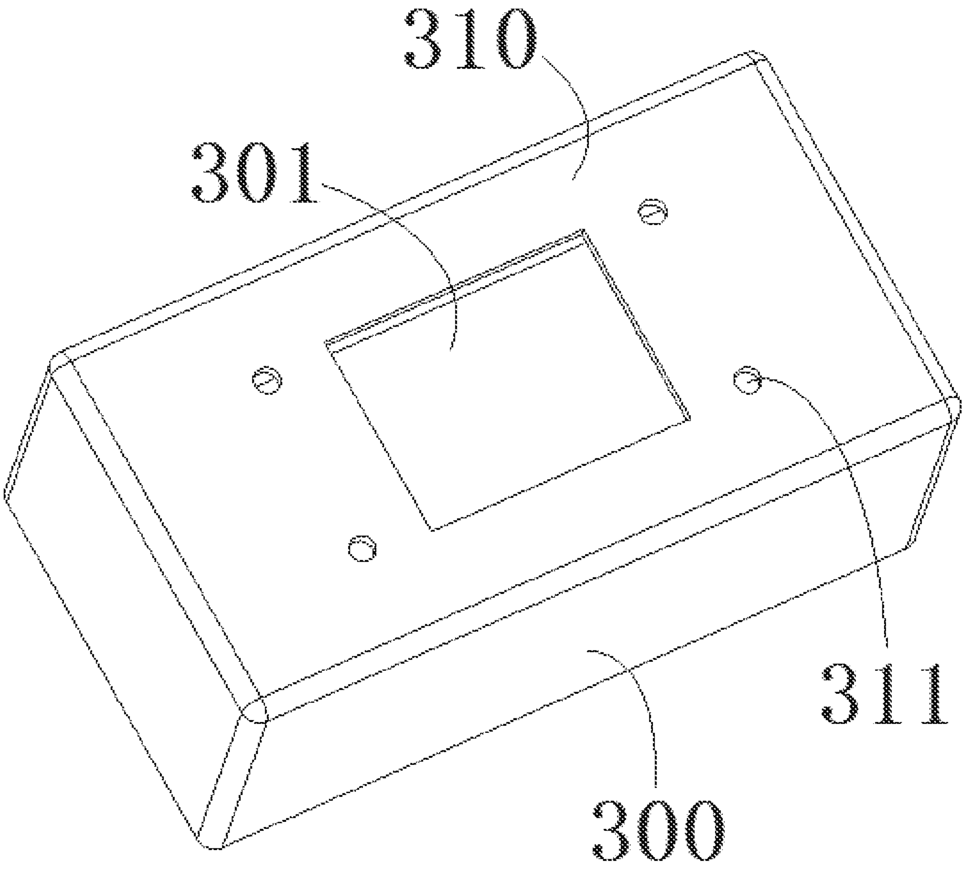
FIG. 4 is a perspective view of a panel according to an embodiment.
Figure 5:
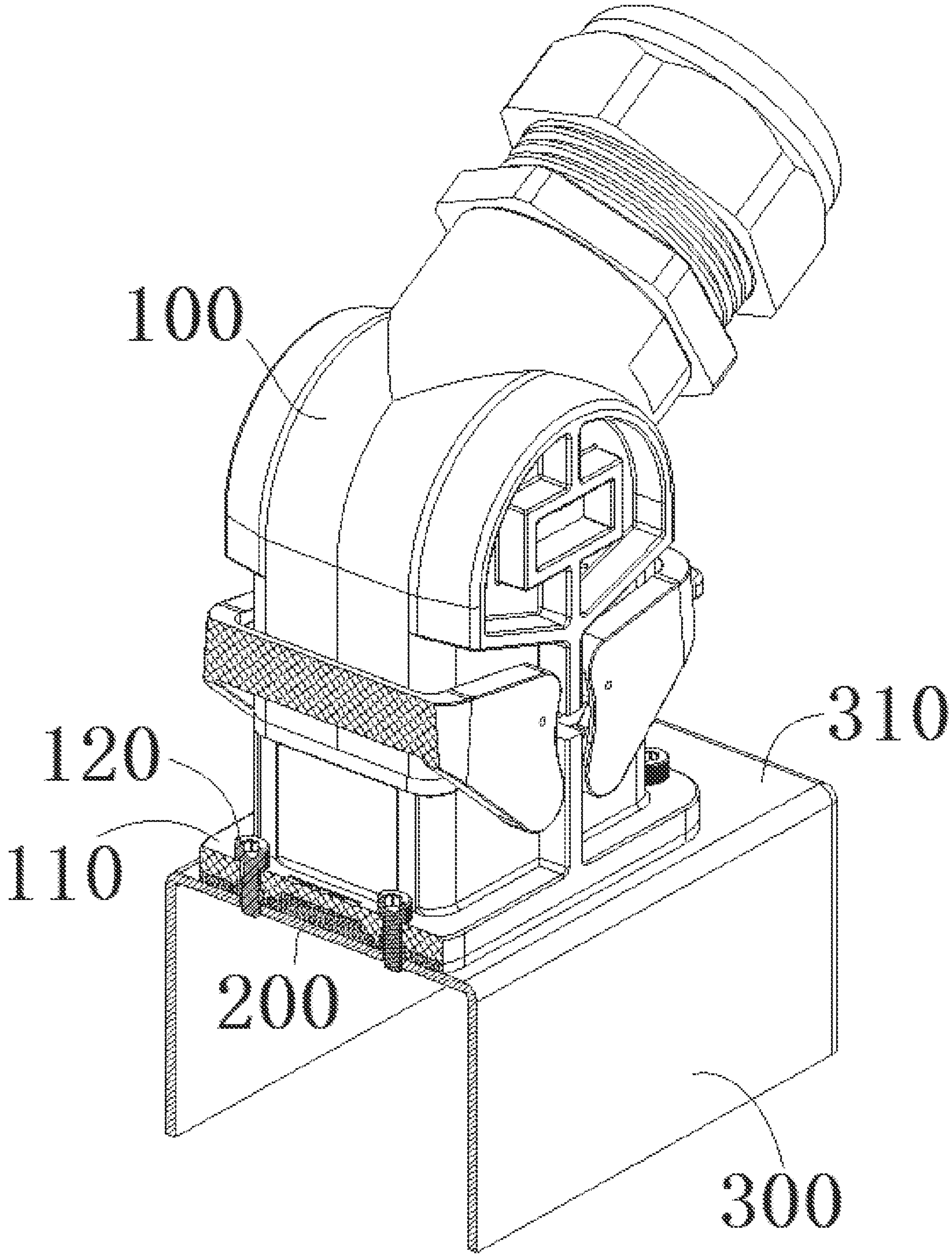
FIG. 5 is a sectional perspective view of the connector assembly.

As shown in FIG. 4, a second connection hole 311 corresponding to the through hole 211 is formed on the panel 310. The connection member 120 is configured to pass through or be connected to the second connection hole 311.

In an embodiment, the connection member 120 is a threaded member, and the second connection hole 311 is a threaded hole suitable for mating with the connection member 120. The connection member 120 is threaded with the second connection hole 311.

However, the present invention is not limited to the illustrated embodiment. For example, in another exemplary embodiment of the present invention, the sealing installation device also includes a nut suitable for mating with the connection member 120. In this case, the connection member 120 is threaded with the nut after passing through the second connection hole 311.

In the shown embodiment, the cross sections of the first connection hole 111, the through hole 211 and the second connection hole 311 are circular, and the cross section of the through slot 212 is arc-shaped and surrounds the through hole 211.

As shown in FIGS. 1 and 3, the elastic sealing washer 200 is rectangular, and the through hole 211 is formed one each of the four corners of the elastic sealing washer 200. An opening 201 is formed on the elastic sealing washer 200, which corresponds to an opening formed on the base 110 of the housing 100 and an opening 301 formed on the panel 310. A mating connector can be inserted into the housing 100 of the connector 10 to mate with the connector 10 through the above openings 201, 301.

As shown in FIG. 1, the connector 10 also includes a terminal 130 mounted in the housing 100. The terminal 130 is used for electrical contact with a mating terminal of the mating connector inserted into the housing 100.

As shown in FIG. 3, a plurality of positioning protrusions 213 are formed on the surface of the elastic sealing washer 200 facing the base 110 of the housing 100. A plurality of positioning recesses 113 respectively corresponding to the plurality of positioning protrusions 213 is formed on the bottom surface of the base 110 of the housing 100, as shown in FIG. 1. In this way, it is convenient to pre-install the elastic sealing washer 200 on the base 110 of the housing 100. In the shown embodiment, a plurality of positioning protrusions 213 are distributed around the opening 201 of the elastic sealing washer 200, and at least some of the positioning protrusions 213 are different in shape or size.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A sealing installation device for hermetically mounting a housing to a panel, comprising:

an elastic sealing washer disposed between a base of the housing and the panel and sealing a mating interface between the base and the panel, the elastic sealing washer has a through slot into which a protrusion formed on a bottom surface of the base is inserted, a thickness of the elastic sealing washer is greater than a height of the protrusion; and a connection member connecting the base of the housing, the elastic sealing washer, and the panel together, a difference between the thickness of the elastic sealing washer and the height of the protrusion is a predetermined value equal to a compression amount of the elastic sealing washer after the housing is installed on the panel, a through hole of the elastic sealing washer receives the connection member, an inner diameter of the through hole is smaller than an outer diameter of the connection member.

2. The sealing installation device of claim 1, wherein a cross-sectional shape of the through slot is the same as a cross-sectional shape of the protrusion, a cross-sectional size of the through slot is smaller than a cross-sectional size of the protrusion.

3. The sealing installation device of claim 1, wherein the connection member extends through a first connection hole of the base of the housing that corresponds to the through hole of the elastic sealing washer.

4. The sealing installation device of claim 3, wherein the outer diameter of the connection member is smaller than an inner diameter of the first connection hole.

5. The sealing installation device of claim 4, wherein the connection member extends through or is connected to a second connection hole on the panel that corresponds to the through hole of the elastic sealing washer.

6. The sealing installation device of claim 5, wherein the connection member is a threaded member and the second connection hole is a threaded hole receiving the connection member.

7. The sealing installation device of claim 5, wherein the connection member is a threaded member, the sealing installation device further comprises a nut threaded with the connection member after the connection member extends through the second connection hole.

8. The sealing installation device of claim 5, wherein the first connection hole, the through hole, and the second connection hole are circular, the through slot is arc-shaped and surrounds the through hole.

9. The sealing installation device of claim 1, wherein the elastic sealing washer is rectangular and the through hole is formed on each of four corners of the elastic sealing washer.

10. The sealing installation device of claim 1, wherein the elastic sealing washer has an opening corresponding to an opening on the base and an opening on the panel.

11. The sealing installation device of claim 10, wherein the elastic sealing washer has a plurality of positioning protrusions on a surface facing the base.

12. The sealing installation device of claim 11, wherein the positioning protrusions mate with a plurality of positioning recesses on the bottom surface of the base of the housing.

13. The sealing installation device of claim 12, wherein the positioning protrusions are distributed around an opening of the elastic sealing washer and at least some of the positioning protrusions have a different shape or size.

14. A connector assembly, comprising:

a connector including a housing having a base, the base has a protrusion on a bottom surface;

a panel; and a sealing installation device including an elastic sealing washer and a connection member, the elastic sealing washer is disposed between the base of the housing and the panel and seals a mating interface between the base and the panel, the elastic sealing washer has a through slot into which the protrusion is inserted, a thickness of the elastic sealing washer is greater than a height of the protrusion, the connection member connects the base of the housing, the elastic sealing washer, and the panel together, a difference between the thickness of the elastic sealing washer and the height of the protrusion is a predetermined value equal to a compression amount of the elastic sealing washer after the housing is installed on the panel, a through hole of the elastic sealing washer receives the connection member, an inner diameter of the through hole is smaller than an outer diameter of the connection member.

15. The connector assembly of claim 14, wherein the sealing installation device hermetically installs the housing on the panel.

16. The connector assembly of claim 14, wherein a cross-sectional shape of the through slot is the same as a cross-sectional shape of the protrusion, a cross-sectional size of the through slot is smaller than a cross-sectional size of the protrusion.

17. The connector assembly of claim 14, wherein the connector includes a terminal in the housing electrically connected with a mating connector inserted into the housing.

* * * * *